(12) United States Patent
Hariharan et al.

(10) Patent No.: US 8,839,316 B2
(45) Date of Patent: Sep. 16, 2014

(54) VOD OFFERINGS BASED ON POPULAR DEMAND

(75) Inventors: Ramprasath Hariharan, Tamil Nadu (IN); Yuriy Bolyukh, Trophy Club, TX (US); Syed Zafar Beyabani, Irving, TX (US); Anil Solleti, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 468 days.

(21) Appl. No.: 12/330,093

(22) Filed: Dec. 8, 2008

(65) Prior Publication Data

US 2010/0146568 A1 Jun. 10, 2010

(51) Int. Cl.
*H04N 7/173* (2011.01)
(52) U.S. Cl.
USPC .................. 725/87; 725/34; 725/35; 725/37; 725/38; 725/46; 725/86
(58) Field of Classification Search
CPC ................ H04N 21/4532; H04N 21/44222; H04N 21/47202; H04N 7/17318; H04N 7/17336
USPC .................................. 725/32–39, 86–104, 46
See application file for complete search history.

(56) References Cited

U.S. PATENT DOCUMENTS

| | | | |
|---|---|---|---|
| 7,599,922 B1* | 10/2009 | Chen et al. | 707/999.01 |
| 7,904,924 B1* | 3/2011 | de Heer et al. | 725/46 |
| 2002/0053076 A1* | 5/2002 | Landesmann | 725/10 |
| 2003/0005447 A1 | 1/2003 | Rodriguez | |
| 2003/0014448 A1 | 1/2003 | Castellanos et al. | |
| 2003/0154486 A1 | 8/2003 | Dunn et al. | |
| 2004/0163114 A1* | 8/2004 | Rodriguez et al. | 725/87 |
| 2006/0218218 A1 | 9/2006 | Ganesan et al. | |
| 2006/0218219 A1 | 9/2006 | Ganesan et al. | |
| 2007/0180465 A1 | 8/2007 | Ou et al. | |
| 2008/0155613 A1* | 6/2008 | Benya et al. | 725/89 |
| 2008/0222106 A1 | 9/2008 | Rao et al. | |
| 2009/0089839 A1* | 4/2009 | Mallian et al. | 725/46 |

FOREIGN PATENT DOCUMENTS

CN 101150635 3/2008

* cited by examiner

*Primary Examiner* — Yassin Alata

(57) ABSTRACT

A system includes a set-top box and a server for a subscription television service. The set-top box includes a processor to receive a video-on-demand (VOD) programming suggestion from a user and send, to the server, the VOD programming suggestion. The server includes a processor to receive the VOD programming suggestion, compile the VOD programming suggestion with other VOD programming suggestions from other set-top boxes, and send a notification to the set-top box that the VOD programming suggestion has been added to the list of available VOD programming for the subscription television service.

20 Claims, 8 Drawing Sheets

VOD OFFERINGS BASED ON POPULAR DEMAND

BACKGROUND INFORMATION

Subscription television service providers (such as cable, optical fiber, or satellite providers) can provide customers with numerous viewing options including an increasing number of video-on-demand (VOD) programs. However, the number of VOD programs that can be made available at a particular time is not unlimited. Thus, providers may limit the amount of time particular VOD programs are made available or may simply not offer some programs as VOD. Providers may rely on variety of factors to select which VOD programs to make available to customers. However, providers may not be aware of certain programming that is of interest to a significant number of customers and, thus, the programming may not be made available to customers through VOD.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a subscription television service provider to receive and compile customer suggestions for possible video-on-demand (VOD) programming and to measure the demand for the customer-suggested VOD programming. Based on the measured demand, the subscription television service provider may make certain customer-suggested VOD programming available to customers as, for example, "popular demand" offerings.

"VOD programming," as used herein, may refer to multimedia content (e.g., movies, music, games, etc.) that may be streamed or downloaded to a set-top box based on a request from a user of the set-top box. As used herein, "customer-suggested VOD programming" or a "VOD programming suggestion" may refer to a request(s) for VOD programming that is not available from a service provider at the time the request is made. As used herein, the terms "set-top box" or "STB" may refer to any media processing system that may receive multimedia content over a network, and may provide such multimedia content to an attached television. Also, as used herein, the terms "viewer," "user," and "customer" may refer interchangeably to a person who views, listens, or plays a multimedia program, video, and/or music (e.g., provided via a STB).

Figure 1:
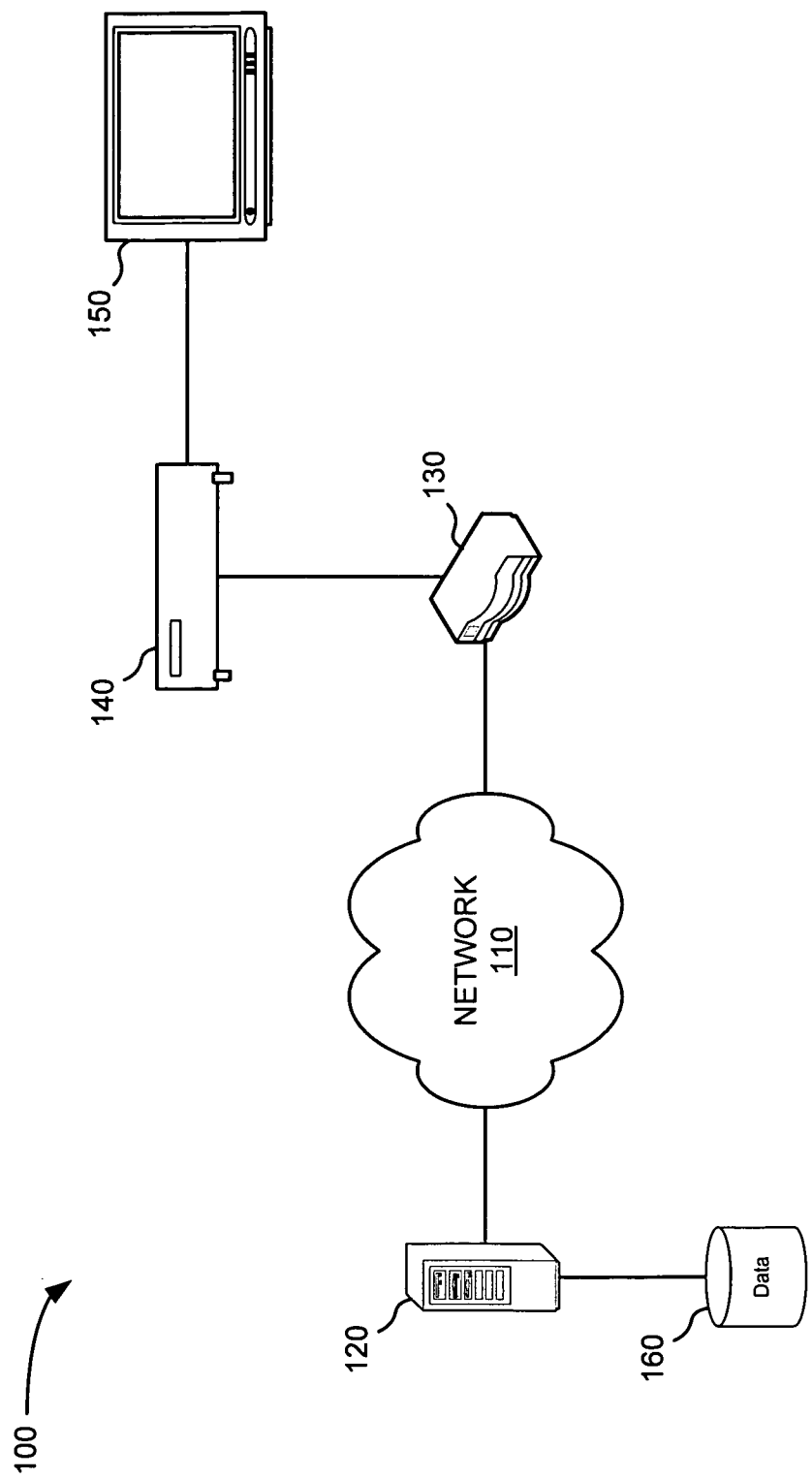
FIG. 1 depicts an exemplary system in which concepts described herein may be implemented.

FIG. 1 is a diagram of an exemplary system 100 in which concepts described herein may be implemented. As illustrated, system 100 may include a network 110 that connects a server 120 to a local gateway 130, a STB 140 and a television 150 that may be located on a customer's premises. Components of system 100 may interconnect via wired and/or wireless connections. A single network 110, server 120, local gateway 130, STB 140, and television 150 have been illustrated in FIG. 1 for simplicity. In practice, there may be more networks 110, servers 120, local gateways 130, STBs 140, and/or televisions 150. Also, in some instances, one or more of the components of network 100 may perform one or more functions described as being performed by another one or more of the components of network 100.

In general, server 120 may provide or provide control over (e.g., via network 110) telecommunication services provided to devices, such as television 150 and/or other network connectivity devices (e.g., Internet and telephone, not shown) provided on the customer's premises. As further shown in FIG. 1, server 120 may connect to a database 160.

Network 110 may include a local area network (LAN), a wide area network (WAN), such as a cellular network, a satellite network, or the Internet, a private WAN, or a combination of the Internet and a private WAN, etc. that is used to transport data. Although shown as a single element in FIG. 1, network 110 may include a number of separate networks that function to provide services to devices, such as STB 140 and/or television 150, at a customer's premises. In one implementation, network 110 may terminate at the customer's premises via an optical communication link, such as an optical fiber provided to the customer's premises. In another possible implementation, network 110 may terminate at the customer's premises via a coaxial cable. In still another implementation, network 110 may terminate at the customer's premises via a wireless (e.g., satellite) connection.

Server 120 may include one or more devices for providing content/information to STB 140 and/or television 150 in accordance with commands that are issued from STB 140. Examples of server 120 may include a headend device that provides broadcast television programs, a VOD device that provides television programs upon request, and a program guide information server that provides information related to television programs available to STB 140. Server 120 may also receive information from one or more STBs, such as recorded information from STB 140 that may include VOD programming suggestions input by a customer into STB 140. Server 120 may store the information from the STBs in, for example, a database, such as database 160.

Gateway 130 may include a network device that provides an interface from network 110 to television 150 and other network connectivity devices (not shown). Gateway 130 may include one of a number of possible gateway devices, including a satellite antenna, a coaxial cable connection, an optical network terminal (ONT), or a broadband access for Internet protocol TV (IPTV). The satellite antenna and receiver may provide an interface for television service broadcast from satellites. The coaxial cable connection may provide an interface for television service connected to a consumer via coaxial cables. The ONT may provide an interface for an optical fiber connection. The broadband IPTV access may generally include any device that provides broadband access over which television service may be provided.

For example, when telecommunication services are provided to the customer's premises via an optical fiber, gateway 130 may include an ONT that connects to the optical fiber. The ONT may convert between signals appropriate for television 150 and signals appropriate for transmission over optical fiber. For example, the ONT may include a coaxial cable connection that leads to television 150 or STB 140. The ONT may also include an Ethernet output port that connects to a personal computer or a VoIP telephone and/or a standard telephone port for connecting to a standard telephone.

STB 140 may include a device for selecting and/or obtaining content that may be shown or played on television 150. STB 140 may receive a television signal from gateway 130, may convert the signal to a form usable by television 150, and may transmit the signal to television 150 for display. STB 140 may further allow a user to alter the programming provided to television 150 based on a signal (e.g., a channel up or channel down signal) from, for example, a remote control (not shown). STB 140 may also be capable of sending data to server 120.

In one implementation, STB 140 may receive user input to identify suggestions for VOD programming that may not currently be offered by a subscription television service provider. STB 140 may provide some or all of the user input to a server, such as server 120. STB 140 may also obtain VOD programming suggestions of other users and may present the obtained suggestions on television 150. STB 140 may obtain the VOD programming suggestions from an internal memory and/or from server 120.

Television 150 may include a digital or analog television through which a user may watch television programming. Television 150 may refer to any device that can receive and display multimedia content delivered over network 110 for perception by users. Television 150 may include technologies such as cathode ray tube (CRT) displays, liquid crystal displays (LCDs), light-emitting diode (LED) displays, plasma displays and any attendant audio generation facilities.

Database 160 may maintain entries relating to subscribers' VOD programming suggestions. For example, database 160 may store information that server 120 receives from one or more STBs. In one implementation, database 160 may include exemplary fields, such as, a submitting STB identification field, a date/time field, and/or a programming identification field. While only one database is shown in FIG. 1, database 160 may consist of multiple databases stored locally at server 120 and/or stored at one or more different and possibly remote locations. Database 160 may maintain additional or different information relating to information regarding subscribers' VOD programming suggestions. In another implementation, for example, database 160 may include an actor field, genre field, description field, or other field to store additional information about a subscriber's VOD programming suggestion.

In implementations described herein, a user may submit a VOD programming suggestion to STB 140 using, for example, television 150 and a remote control. STB may forward the programming suggestion to server 120. Server 120 may store the programming suggestion, for example, in database 160, along with programming suggestions received from other STBs. Based on information provided in database 160, server 120 can identify the most-suggested programming, rank the suggestions by quantity, and/or identify suggestions that reach a particular threshold quantity. A subscription television service provider may make use the suggestion information from server 120 to determine new VOD programming to make available to customers. In one implementation, particular customers may be notified when one of their suggestions is added to the subscription television service provider's available programming.

Although only a single television 150 is shown in FIG. 1, any particular customer's premises may include a number of devices capable of displaying multimedia content. Further, although a television for a single customer's premises is shown in FIG. 1, server 120 may interact with many customers' premises and/or their televisions.

Figure 2:
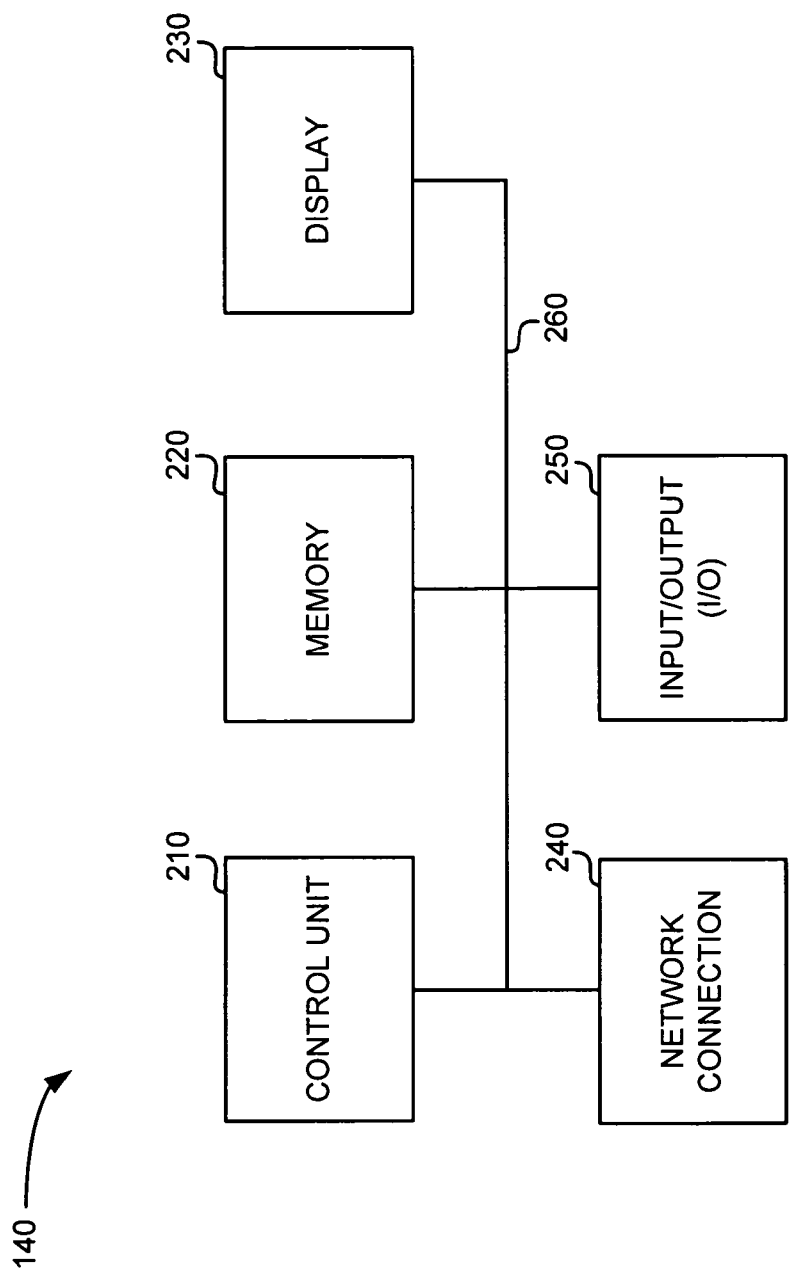
FIG. 2 is a block diagram of exemplary components of a set-top box that may be used in the network of FIG. 1.

FIG. 2 is diagram illustrating exemplary components of STB 140. As shown, STB 140 may include a control unit 210, memory 220, a display 230, a network connection 240, an input/output (I/O) component 250, and a bus 260.

Control unit 210 may include a processor, microprocessor, or other type of processing logic that may interpret and execute instructions. Among other functions, control unit 210 may collect and store viewing histories associated with television programming. Control unit 210 may execute instructions to send viewer start-up preferences and viewing history information to another device, such as server 120. Control unit 210 may also receive information and/or instructions from other devices, such as server 120.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store user suggestions for additional VOD programming (e.g., a user's "VOD Wish List").

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), images, and/or video information. Display 230 may be an optional component.

Network connection 240 may include any transceiver-like mechanism that enables STB 140 to communicate with other devices and/or systems. For example, network connection 240 may include an Ethernet interface, an optical interface, a coaxial interface, a radio interface, or the like. Network connection 240 may allow for wired, wireless, and/or optical communication. Network connection 240 may be configured to connect STB 140 to a packet-based IP network.

Input/output devices 250 may generally include user input devices such as external buttons and output devices such as a display or printer. With input/output devices 250, a user may generally interact with STB 140. In some implementations, input/output devices 250 may be implemented via a remote control. Bus 260 may provide an interface through which components of STB 140 can communicate with one another.

As will be described in detail below, STB 140 may perform certain operations relating to soliciting, receiving, and communicating VOD programming suggestions in accordance with viewer preferences. STB 140 may perform these operations in response to control unit 210 executing software instructions contained in a computer-readable medium, such as memory 220. A computer-readable medium may be defined as a physical or logical memory device.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of STB 140, in other implementations, STB 140 may include different, fewer, additional, and/or differently arranged components than those depicted in FIG. 2. In still other implementations, one or more components of STB 140 may perform one or more other tasks described as being performed by one or more other components of STB 140.

Figure 3:
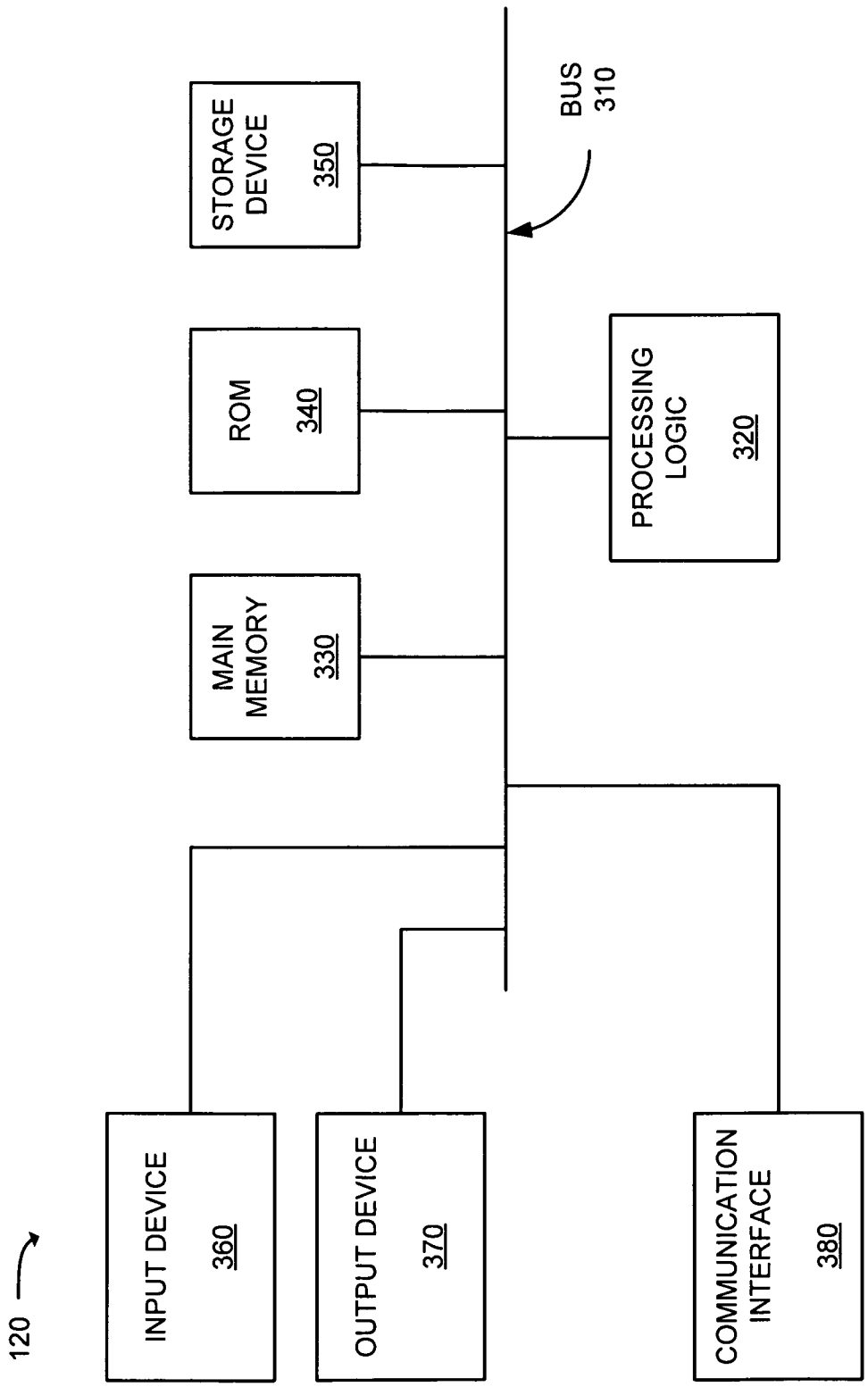
FIG. 3 is a block diagram of exemplary components of server that may be used in the network of FIG. 1.

FIG. 3 is a diagram of exemplary components of server 120. As illustrated, server 120 may include a bus 310, processing logic 320, a main memory 330, a read-only memory (ROM) 340, a storage device 350, an input device 360, an output device 370, and a communication interface 380. In other implementations, server 120 may include additional (or other) components than illustrated in FIG. 3.

Bus 310 may include a path that permits communication among the components of server 120. Processing logic 320 may include a processor, microprocessor, or other type of processing logic, such as an application-specific integrated circuit (ASIC), a field-programmable gate array (FPGA), etc., that may interpret and execute instructions. Main memory 330 may include a RAM or another type of dynamic storage device that may store information and instructions for execution by processing logic 320. ROM 340 may include a ROM device or another type of static storage device that may store static information and instructions for use by processing logic 320. Storage device 350 may include a magnetic and/or optical recording medium and its corresponding drive. In one implementation, storage device may include database 160 (FIG. 1). Storage device 350 may store viewer suggestions and ranking information that may indicate most-requested VOD programming.

Input device 360 may include a mechanism that permits an operator to input information to server 120, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables server 120 to communicate with other devices and/or systems, such as set-top box 210.

As will be described in detail below, server 120 may perform certain operations to identify most-requested VOD programming and notify users when their suggested VOD programming becomes available. Server 120 may perform these and other operations in response to processing logic 320 executing software instructions contained in a computer-readable medium, such as main memory 330.

The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Figure 4:
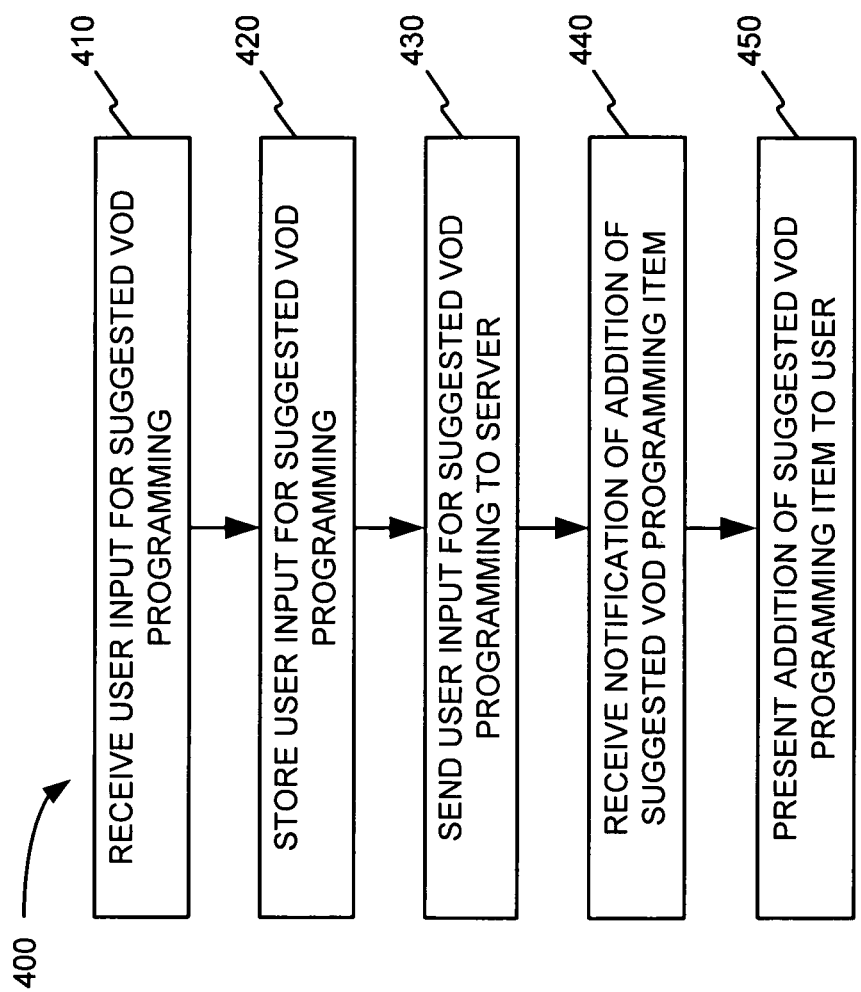
FIG. 4 is a process flow illustrating exemplary operations that may be performed by the set-top box to receive user input for VOD programming options.

FIG. 4 provides a process flow 400 illustrating exemplary operations that may be performed by a set-top box, such as STB 140, to receive user suggestions for VOD programming. Process 400 may begin with receiving user input for suggested VOD programming (block 410). For example, STB 140 may receive a viewer's input for a "VOD Wish List" via an interactive menu selection process that also allows for free-form text entry. The menus may be displayed, for example, on television 150. In one implementation, a user may be presented with lists of suggested VOD programs from other view. In another implementation, a free-form textbox may accept user input (e.g., from a remote control) and list entries from other suggestions that conform to the text entered by the user.

The user input for the suggested VOD programming may be stored (block 430). For example, STB 140 may store the user input as part of a personal VOD wish list. The VOD wish list may be stored, for example, in memory 220 of STB 140.

The user input for the suggested VOD programming may be sent to a server (block 430). For example, STB 140 may send the user input for suggested VOD programming to server 120. In one implementation, the user input may be combined with a batch communication from STB 140 to server 120. In another implementation, the user input may be submitted as a separate request. The server 120 may receive the VOD programming suggestion and eventually offer the suggested programming to subscribers.

Notification of the addition of the suggested VOD programming item may be received (block 440). For example, STB 140 may receive from server 120 a notification that a particular item from the user's VOD wish list has been made available to subscribers. The notification from server 120 may be a notification particular to the item (e.g., that a particular movie has been added to a list of VOD selections) or the notification may be an updated VOD title list that includes the item from the user's VOD wish list. In one implementation, STB 140 may be configured to monitor changing VOD offerings to identify when an item form a user's wish list becomes available.

The notification of the suggested VOD programming item may be presented to the user (block 450). For example, STB 140 may provide an indication to a user that an item from the users VOD wish list has been made available as a VOD item. In an exemplary implementation, STB 140 may provide an indication to the user when the user activates a VOD poster view. In another exemplary implementation, the new item may be marked as available on the user's VOD wish list.

Figure 5:
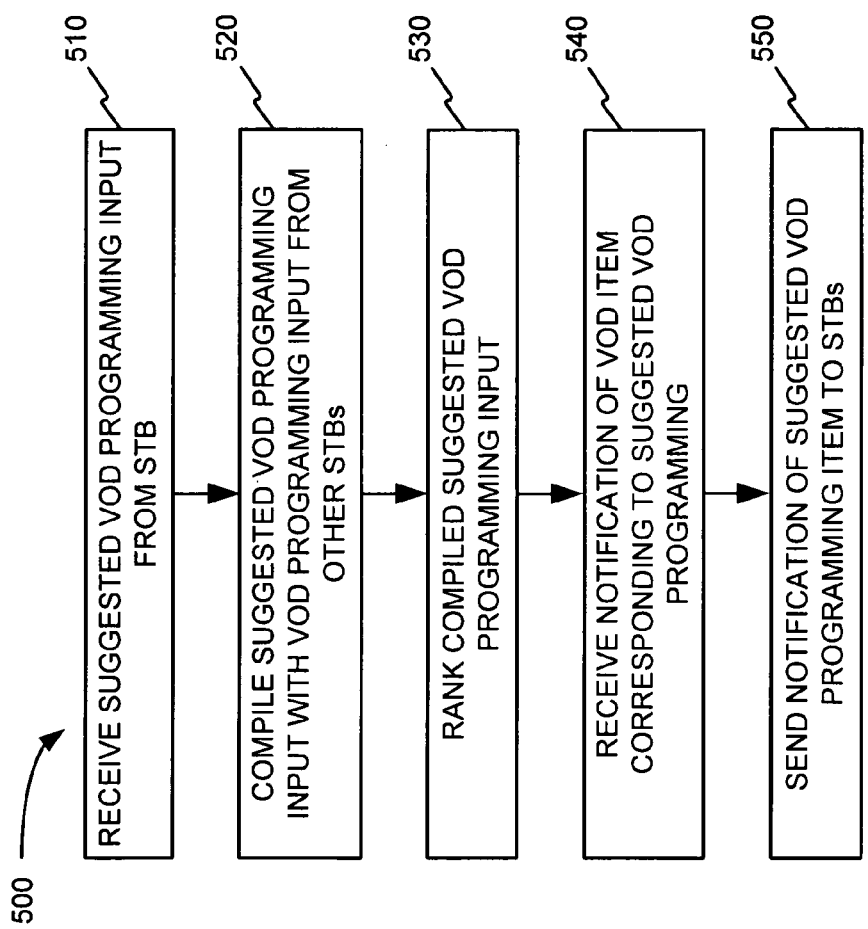
FIG. 5 is a process flow illustrating exemplary operations that may be performed by the server to provide popular demand VOD programming options.

FIG. 5 is a process flow 500 illustrating exemplary operations that may be performed by a server (e.g., server 120) to provide popular demand VOD programming options. Process 500 may begin with receiving suggested VOD programming list input from a STB (block 510). For example, server 120 may receive descriptions of VOD wish list items from STB 140 and other STBs.

The suggested VOD programming input may be compiled with suggested VOD programming input from other STBs (block 520). For example, server 120 may compile the suggestions (e.g., in database 160) and sort the suggestions. In one implementation, server 120 may attempt to normalize the data to account for typographical errors and/or spelling variations.

The compiled suggested VOD programming input may be ranked (block 530). For example, server 120 may identify the programming with the most suggestions, rank the suggestions by quantity, and/or identify any program that receives a particular number of suggestions. In another implementation, suggested VOD programming input may be weighted based on a combination of factors. For example, server 120 may collect viewing histories from STBs and apply information from a STB viewing history to weight a suggestion. In an exemplary implementation, suggestions from previous purchasers of VOD programming may be weighted more heavily than suggestions from subscribers with no VOD purchase history. In another exemplary implementation, viewer suggestions may be weighted based on the number of previous VOD programs purchased within a recent time period (e.g., a suggestion from a STB with a history of 11 VOD purchased in the past 12 months may be weighted more heavily than a suggestion from a STB with a history of 2 VOD purchases during the same period).

A notification of a VOD item corresponding to suggested VOD programming may be received (block 540). For example, server 120 may receive a notification that a VOD program has been added. In one implementation, the compiled VOD programming suggestions may be presented for use by an administrator to determine if a suggested VOD program may be added. When a decision is made by the administrator to add the suggested VOD program, the program may be flagged as a VOD wish list item. For example, the program may be marked for inclusion in a "popular demand" category of VOD items.

A notification of the suggested VOD programming item may be sent to the STBs (block 550). For example, server 120 may provide a notification to STB 140 that an item from the STB's VOD wish list has been made available for purchase. In one implementation, the notification may be in the form of an updated listing of all VOD titles that may be distributed to all STBs 140 receiving the subscription television service. Each STB 140 may then identify the newly added VOD item by cross referencing the listing of all VOD titles with the user's VOD wish list. In another implementation, server 120 may send a notice to particular STBs that had submitted the particular VOD programming suggestion (based on, e.g., records in database 160).

Figure 6A:
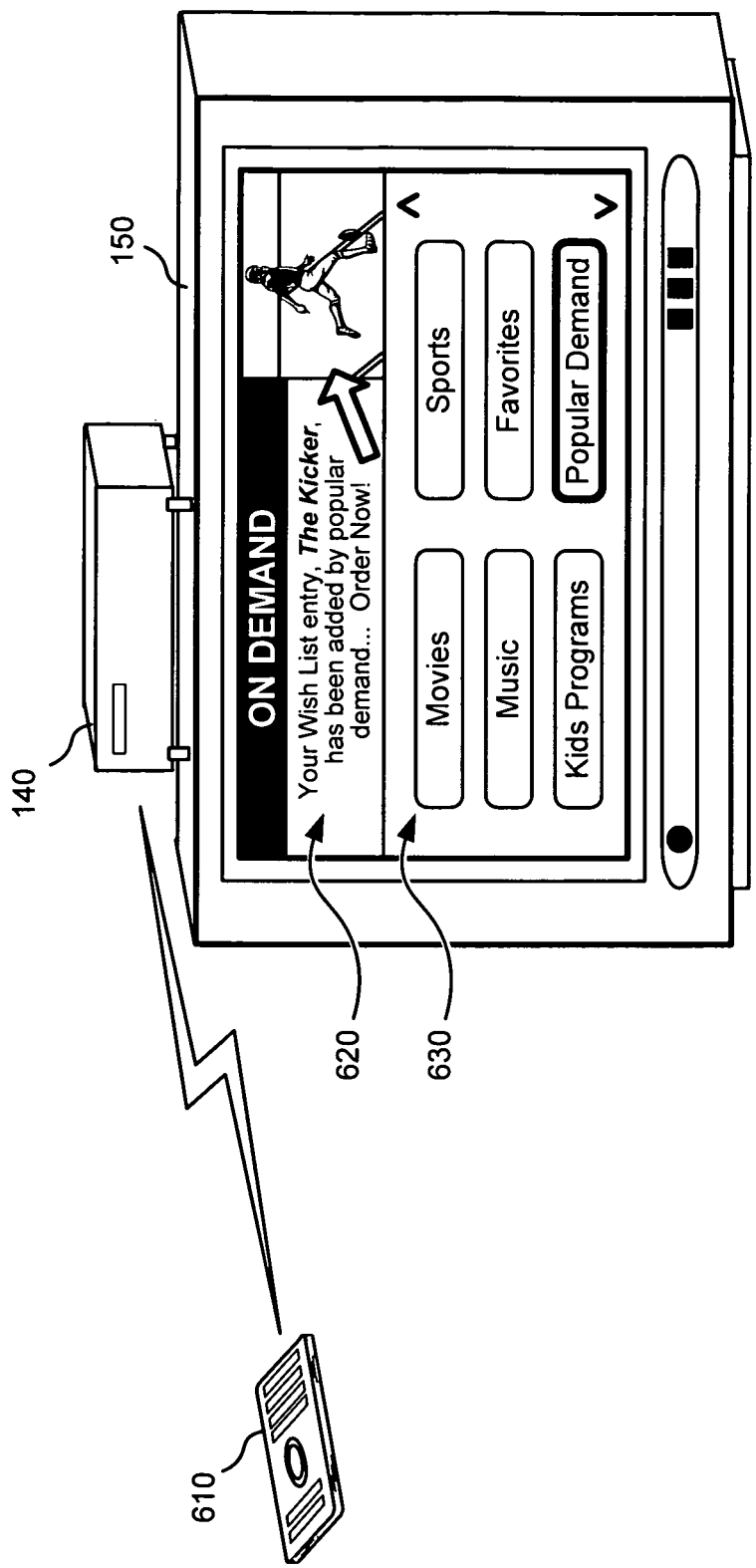
FIGS. 6A, 6B and 6C are exemplary diagrams illustrating a concept described herein.
Figure 6B:
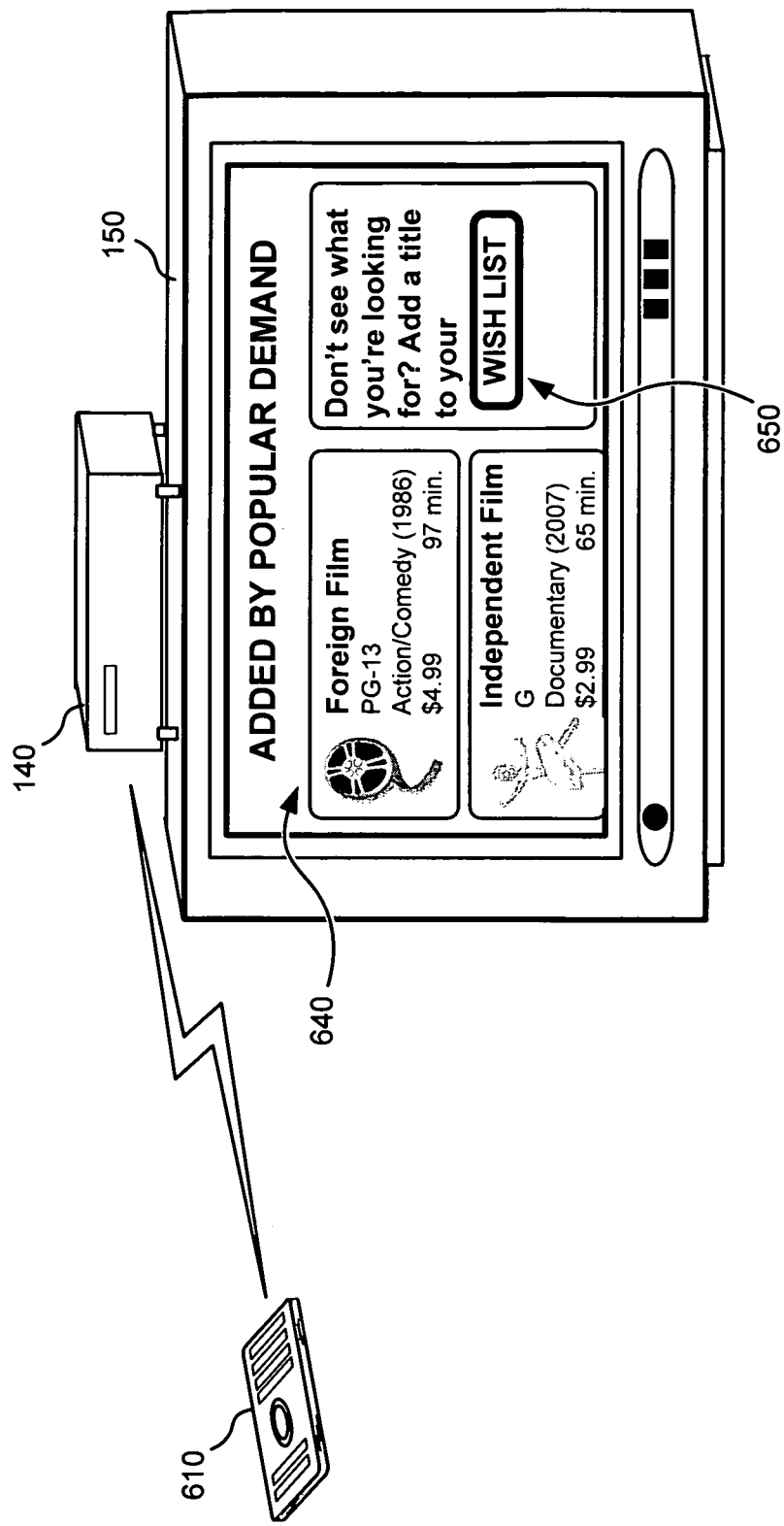
Figure 6C:
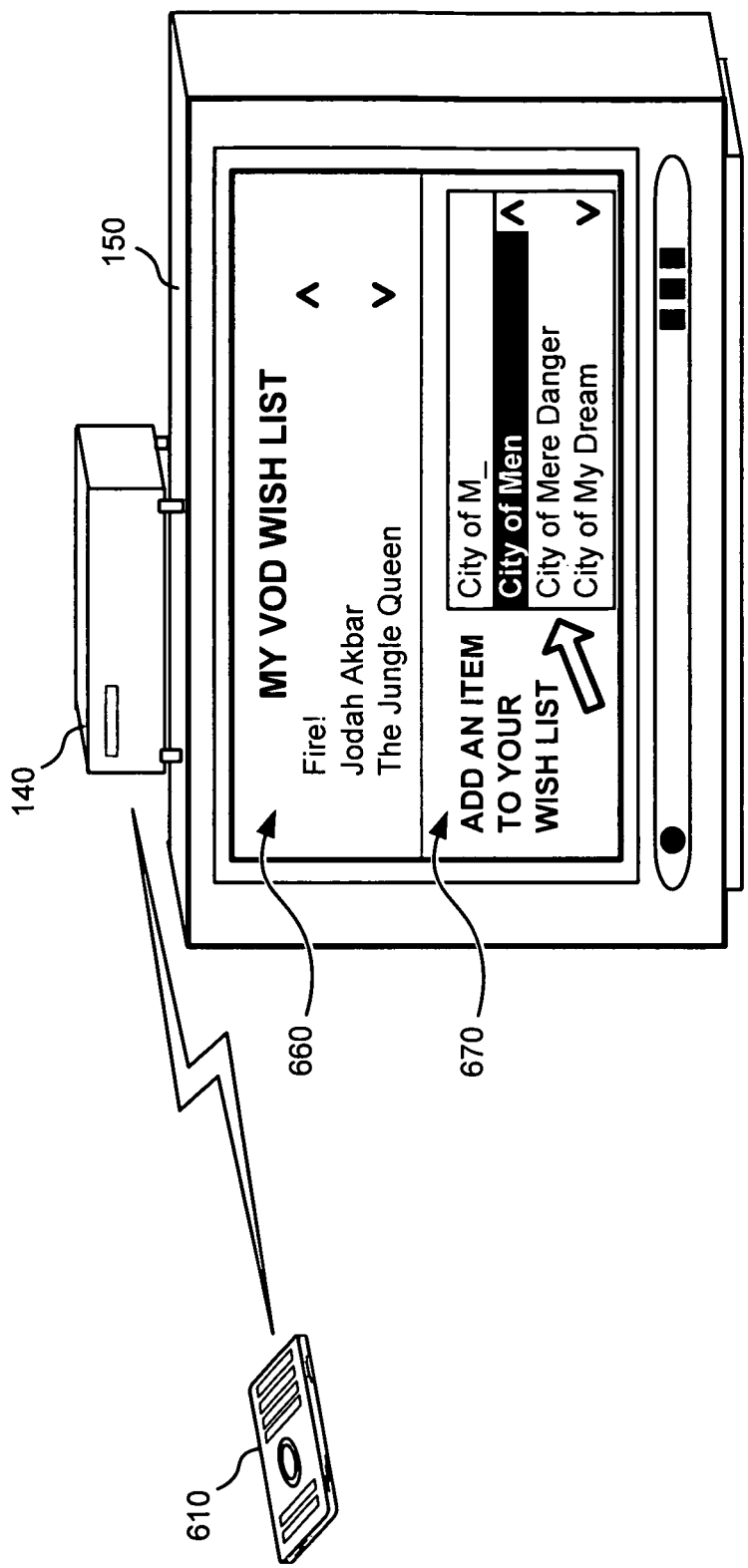

FIGS. 6A, 6B and 6C are exemplary diagrams illustrating an implementation of VOD system including a popular demand options according to systems and/or methods described herein. More specifically, FIG. 6A provides an exemplary diagram of a user interface for viewing VOD programming options and receiving a VOD wish list notification; FIG. 6B provides an exemplary diagram of a popular demand VOD selection screen in accordance with the selection shown in FIG. 6A; and FIG. 6C provides an exemplary diagram of a VOD wish list screen in accordance with the selection shown in FIG. 6B.

Referring to FIG. 6A, a viewer may elect to enter a VOD selection screen to display on television 150. The viewer may select the VOD selection screen, for example, by pressing a designated button on a remote control, such as remote control 610, or tuning to a designated channel for a VOD selection screen. The VOD selection screen may include a notice, such as notice 620 displayed on television 150 of FIG. 6A, that an item from the viewer's wish list has been recently added as a VOD purchase option for the subscription television service. In one implementation, notice 620 may include a link to order the item from the viewer's wish list directly from the VOD selection screen. The viewer may select (e.g., via remote control 610) the item from the user's wish list in notice 620 or a category of VOD programming from a menu, such as the menu 630 displayed on television 150. For example, the viewer may select VOD options such as "Movies," "Sports," "Music," "Favorites," "Kids Programs," "Popular Demand," etc.

Menu 620 may also include sub-menus for one or more options. Sub-menus may be implemented, for example, as drop-down menus within menu 620 (not shown) or as separately displayed sub-menus. For example, selecting the "Popular Demand" menu selection shown in FIG. 6A may cause a sub-menu 640 of FIG. 6B to be displayed.

Sub-menu 640 may allow a viewer to select from particular VOD programming that has been previously added to the subscription television service in response to user suggestions for VOD programming. Sub-menu 640 may also provide a menu item 650 that allows a user to access a personalized wish list. Selecting the "Wish List" menu item 650 shown in FIG. 6B may cause a sub-menu 660 of FIG. 6C to be displayed.

Sub-menu 660 may include a list of the user's suggested VOD programming (e.g., "My VOD Wish List") that may have been previously stored in STB 140. In one implementation, additional information about each item in "My VOD Wish List" may be displayed by highlighting (e.g., toggling to a particular entry using remote control 610) or selecting the item. The additional information may include, for example, information regarding the nature of the item (e.g., actors, dates, genre, plot, etc.) or information regarding the status of the item as suggested VOD programming (e.g., date the item was added to the user's VOD wish list, the number of subscribers that have added the item to their VOD wish list, etc.).

Sub-menu 660 may also include a section 670 to allow a user to add a new VOD programming suggestion to the user's VOD wish list. As shown in FIG. 6C, in one implementation, the user may enter the title of a program as free-form text using a remote control. As text is input by the user, STB 140 may display titles that other subscribers have submitted as suggested VOD programming and/or titles of previously-offered VOD programming that is not currently available. The user may continue to enter text and submit the user's own title or select from a listed item. In another implementation, a user may be provided with the option of simply viewing all titles that are included as suggested VOD programming in, e.g., database 160. The options and arrangements shown in menus 620, 640, and 660 are exemplary, and many other categories and/or sub-categories of VOD programming may be used.

Systems and/or methods described herein may provide a set-top box and a server for a subscription television service. The set-top box may receive a video-on-demand (VOD) programming suggestion from a user and send, to the server, the VOD programming suggestion. The server may receive the VOD programming suggestion and compile the VOD programming suggestion with other VOD programming suggestions from other set-top boxes. The compiled information may be used by a administrator to determine if the VOD programming suggestion will be made available as a VOD item. Assuming the VOD programming suggestion is added to the subscription television service, the server may send a notification to the set-top box that the VOD programming suggestion has been added to the list of available VOD programming.

The foregoing description provides illustration and description, but is not intended to be exhaustive or to limit the implementations to the precise form disclosed. Modifications and variations are possible in light of the above teachings or may be acquired from practice of systems and/or methods disclosed herein.

Also, while series of blocks have been described with regard to the flowchart of FIGS. 4 and 5, the order of the blocks may differ in other implementations. Further, non-dependent acts may be performed in parallel.

It will be apparent that implementations, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a set-top box, the method comprising:
   receiving, by the set-top box and from a user of a subscription television service, a video-on-demand (VOD) programming suggestion;
   automatically sending, by the set-top box and to a server, the VOD programming suggestion;
   receiving, by the set-top box and from the server, a notification that a program corresponding to the VOD programming suggestion is available for purchase,
      the availability of the VOD programming suggestion being based on a compiled VOD programming suggestion that includes the VOD programming suggestion and other VOD programming suggestions from other set-top boxes,
   the compiled VOD programming suggestion being created by ranking the VOD programming suggestion with the other VOD programming suggestions, and
   the other VOD programming suggestions from the other set-top boxes including corresponding ranking weights based on a number of previous VOD programs purchased by the other set-top boxes within a predetermined period of time,
      a first ranking weight, of the corresponding ranking weights, being associated with a first set-top box of the other set-top boxes, the first set-top box being associated with a first plurality of purchased VOD programs,
      a second ranking weight, of the corresponding ranking weights, being associated with a second set-top box of the other set-top boxes, the second set-top box being associated with a second plurality of purchased VOD programs,
      the first ranking weight being based only on a number of the first plurality of purchased VOD programs associated with the first set-top box within the predetermined period of time,
      the second ranking weight being based only on a number of the second plurality of purchased VOD programs associated with the second set-top box within the predetermined period of time, and
      the first ranking weight being greater than the second ranking weight when the number of the plurality of purchased VOD programs, associated with the first set-top box, is greater than the number of the plurality of purchased VOD programs, associated with the second set-top box; and
   providing, by the set-top box, the availability of the program corresponding to the VOD programming suggestion to the user.

2. The method of claim 1, further comprising:
   storing, by the set-top box, the VOD programming suggestion in a memory; and
   providing, for presentation and by the set-top box and to the user, the VOD programming suggestion along with other suggested VOD programming input by the user.

3. The method of claim 2, further comprising:
   providing, for presentation and by the set-top box, a menu-based display to accept the input from the user.

4. The method of claim 3, where the menu-based display accepts free-form text entry and allows the user to select from previous VOD programming suggestions.

5. The method of claim 4, where the previous VOD programming suggestions includes the other VOD programming suggestions from other set-top boxes.

6. The method of claim 1, where the automatically sending comprises:
   associating the VOD programming suggestion with an identifier for the set-top box and a date of entry; and
   sending the VOD programming suggestion, the identifier, and the date of entry as a single message.

7. The method of claim 1, where the VOD programming suggestion is submitted to the set-top box via a remote control.

8. The method of claim 1, where the presenting the availability of the program corresponding to the VOD programming suggestion comprises:
   causing, by the set-top box, the program corresponding to the VOD programming suggestion to be displayed with a list of other suggested VOD programming items that have been made available in the subscription television service.

9. A method comprising:
   receiving, by a device, a video-on-demand (VOD) programming suggestion from a set-top box associated with a subscription television service;
   receiving, by the device, one or more other VOD programming suggestions from two or more other set-top boxes;
   ranking, by the device, the VOD programming suggestion with the one or more other VOD programming suggestions, the one or more other VOD programming suggestions including corresponding ranking weights based on a number of previous VOD programs purchased by the two or more other set-top boxes within a predetermined period of time,
      a first ranking weight, of the corresponding ranking weights, being associated with a first set-top box of the two or more other set-top boxes, the first set-top box being associated with a first plurality of purchased VOD programs,
      a second ranking weight, of the corresponding ranking weights, being associated with a second set-top box of the two or more other set-top boxes, the second set-top box being associated with a second plurality of purchased VOD programs,
the first ranking weight being based only on a number of the first plurality of purchased VOD programs associated with the first set-top box within the predetermined period of time,
the second ranking weight being based only on a number of the second plurality of purchased VOD programs associated with the second set-top box within the predetermined period of time, and
the first ranking weight being greater than the second ranking weight when the number of the plurality of purchased VOD programs, associated with the first set-top box, is greater than the number of the plurality of purchased VOD programs, associated with the second set-top box;
compiling, by the device and based on the ranking, the VOD programming suggestion with the one or more other VOD programming suggestions; and
receiving, by the device, a notification that the VOD programming suggestion has been added to a list of available VOD programming for the subscription television service.

10. The method of claim 9, where the ranking is further based on a viewing history of each of the two or more other set-top boxes.

11. The method of claim 9, further comprising:
sending a notification to the set-top box that the VOD programming suggestion has been added to the list of available VOD programming for the subscription television service.

12. The method of claim 11, where the sending the notification to the set-top box includes one of:
sending an updated list of all available VOD titles; or
sending a notice that the VOD programming suggestion has been made available.

13. The method of claim 9, further comprising:
sending, to the set-top box, a list of the compiled VOD programming suggestion and other VOD programming suggestions.

14. The method of claim 9, further comprising:
normalizing the VOD programming suggestion and other VOD programming suggestions to account for typographical errors and spelling variations.

15. The method of claim 9, where the receiving the notification that the VOD programming suggestion has been added to the list of available VOD programming for the subscription television service includes:
receiving an updated list of all available VOD titles.

16. A system comprising:
a memory to store instructions; and
a device to execute the instructions to:
receive video-on-demand (VOD) programming suggestions from multiple set-top boxes associated with a subscription television service;
rank the VOD programming suggestions using ranking weights based on a number of previous VOD programs purchased by each of the set-top boxes within a predetermined period of time,
a first ranking weight, of the corresponding ranking weights, being associated with a first set-top box of the multiple set-top boxes, the first set-top box being associated with a first plurality of purchased VOD programs,
a second ranking weight, of the corresponding ranking weights, being associated with a second set-top box of the multiple set-top boxes, the second set-top box being associated with second a plurality of purchased VOD programs,
the first ranking weight being based only on a number of the first plurality of purchased VOD programs associated with the first set-top box within the predetermined period of time,
the second ranking weight being based only on a number of the second plurality of purchased VOD programs associated with the second set-top box within the predetermined period of time, and
the first ranking weight being greater than the second ranking weight when the number of the plurality of purchased VOD programs, associated with the first set-top box, is greater than the number of the plurality of purchased VOD programs, associated with the second set-top box;
compile, based on the ranking, one or more VOD programming suggestions;
transmit, based on the compiling, one or more VOD programs to a set-top box;
provide, for presentation, a menu with a plurality of categories, each category including at least one of the one or more VOD programs;
receive information indicating a selection of one of the plurality of categories; and
provide, for presentation, a sub-menu that includes the at least one of the one or more VOD programs.

17. The system of claim 16, where the device is further to:
provide, to a set-top box, an indication that one of the VOD programming suggestions submitted by one of the multiple set-top boxes has been made available for purchasing.

18. A system comprising:
a memory to store instructions; and
a server including a processor to execute the instructions to:
receive a VOD programming suggestion from a set-top box;
receive one or more other VOD programming suggestions from two or more other set-top boxes;
rank the VOD programming suggestion with the one or more other VOD programming suggestions, the one or more other VOD programming suggestions including corresponding ranking weights based on a number of previous VOD programs purchased by the two or more other set-top boxes within a predetermined period of time,
a first ranking weight, of the corresponding ranking weights, being associated with a first set-top box of the two or more other set-top boxes, the first set-top box being associated with a first plurality of purchased VOD programs,
a second ranking weight, of the corresponding ranking weights, being associated with a second set-top box of the two or more other set-top boxes, the second set-top box being associated with a second plurality of purchased VOD programs,
the first ranking weight being based only on a number of the first plurality of purchased VOD programs associated with the first set-top box within the predetermined period of time,
the second ranking weight being based only on a number of the second plurality of purchased VOD programs associated with the second set-top box within the predetermined period of time, and
the first ranking weight being greater than the second ranking weight when the number of the plurality of purchased VOD programs, associated with the first set-top box, is greater than the number of the plurality of purchased VOD programs, associated with the second set-top box;

compile, based on the ranking, the VOD programming suggestion with the one or more other VOD programming suggestions;

send, based on the compiling, a notification to the set-top box that the VOD programming suggestion has been added to a list of available VOD programs for the subscription television service;

provide, for presentation, a menu with a plurality of categories, each category including at least one VOD program, of the available VOD programs;

receive information indicating a selection of one of the plurality of categories; and provide, for presentation, a sub-menu that includes the at least one VOD program.

19. The system of claim 18, where the server further comprises:

a memory to store the VOD programming suggestion.

20. The system of claim 18, where the ranking is further based on a viewing history of each of the two or more other set-top boxes.

* * * * *